(12) United States Patent
Yu et al.

(10) Patent No.: US 10,827,501 B2
(45) Date of Patent: Nov. 3, 2020

(54) TECHNIQUES FOR PROVIDING PROXIMITY SERVICES (PROSE) PRIORITY-RELATED INFORMATION TO A BASE STATION IN A WIRELESS NETWORK

(71) Applicant: NOKIA SOLUTIONS AND NETWORKS OY, Espoo (FI)

(72) Inventors: Ling Yu, Kaunianen (FI); Curt Wong, Bellevue, WA (US); Vinh Van Phan, Oulu (FI); Manivannan Thyagarajan, Coppell, TX (US); Michael Dolan, Bolingbrook, IL (US); Gyorgy Tamas Wolfner, Budapest (HU)

(73) Assignee: Nokia Solutions and Networks Oy, Espoo (FI)

(*) Notice: Subject to any disclaimer, the term of this patent is extended or adjusted under 35 U.S.C. 154(b) by 116 days.

(21) Appl. No.: 16/079,535

(22) PCT Filed: Feb. 25, 2016

(86) PCT No.: PCT/US2016/019596
§ 371 (c)(1),
(2) Date: Aug. 23, 2018

(87) PCT Pub. No.: WO2017/146710
PCT Pub. Date: Aug. 31, 2017

(65) Prior Publication Data
US 2019/0053215 A1     Feb. 14, 2019

(51) Int. Cl.
*H04W 72/04* (2009.01)
*H04B 7/155* (2006.01)
(Continued)

(52) U.S. Cl.
CPC ...... *H04W 72/048* (2013.01); *H04B 7/15542* (2013.01); *H04W 28/0268* (2013.01); *H04W 36/0016* (2013.01); *H04W 72/10* (2013.01)

(58) Field of Classification Search
None
See application file for complete search history.

(56) References Cited

U.S. PATENT DOCUMENTS

2004/0160919 A1* 8/2004 Balachandran ....... H04L 1/0028
370/335
2015/0139184 A1* 5/2015 Wang .................... H04W 28/08
370/331
(Continued)

FOREIGN PATENT DOCUMENTS

WO       2016022849 A1     2/2016

OTHER PUBLICATIONS

U.S. Appl. No. 62/232,842, filed Sep. 25, 2015, Pan (Year: 2015).*
(Continued)

*Primary Examiner* — Jay L Vogel
(74) *Attorney, Agent, or Firm* — Brake Hughes Bellerman LLP (57) ABSTRACT

An example technique is provided for receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device, and allocating (or scheduling), by the base station based on the priority map, wireless resources to the relay user device to transmit data to the remote user device for one or more of the ProSe sidelink logical channels.

15 Claims, 7 Drawing Sheets

(51) Int. Cl.
*H04W 28/02* (2009.01)
*H04W 36/00* (2009.01)
*H04W 72/10* (2009.01)

(56) References Cited

U.S. PATENT DOCUMENTS

| | | | |
|---|---|---|---|
| 2017/0093541 A1* | 3/2017 | Pan | H04L 5/0048 |
| 2017/0230939 A1* | 8/2017 | Rudolf | H04L 12/1863 |
| 2018/0092017 A1* | 3/2018 | Freda | H04W 36/36 |
| 2018/0167842 A1* | 6/2018 | Bergstrom | H04W 28/0278 |
| 2018/0206260 A1* | 7/2018 | Khoryaev | H04W 72/02 |
| 2018/0255499 A1* | 9/2018 | Loehr | H04W 40/22 |

OTHER PUBLICATIONS

U.S. Appl. No. 62/204,712, filed Aug 13, 2015, Bergstrom (Year: 2015).*
U.S. Appl. No. 62/144,667, filed Apr. 8, 2015, Freda (Year: 2015).*
International Search Report and Written Opinion for International Application No. PCT/US2016/019596, dated Nov. 10, 2016 (12 pages).
3GPP TSG-RAN WG2 Meeting #92, R2-156271, "Discussion on the mapping between priority and LCG", Anaheim, CA, USA; Nov. 16-20, 2015 (2 pages).
3GPP TS 23.203 V13.6.0 (Dec. 2015); 3rd Generation Partnership Project;Technical Specification Group Services and System Aspects; Policy and charging control architecture (Release 13); Valbonne, France; Dec. 2015 (242 pages).
3GPP TS 23.401 V135.0 (Dec. 2015); 3rd Generation Partnership Project; Technical Specification Group Services and System Aspects; General Packet Radio Service (GPRS) enhancements for Evolved Universal Terrestrial Radio Access Network (E-UTRAN) access (Release 13); Valbonne, France; Dec. 2015 (337 pages).
3GPP TS 36.321 V13.0.0 (Dec. 2015); 3rd Generation Partnership Project; Technical Specification Group Radio Access Network; Evolved Universal Terrestrial Radio Access (E-UTRA); Medium Access Control (MAC) protocol specification (Release 13); Valbonne, France; Dec. 2015 (82 pages).
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13); Valbonne, France; Dec. 2015 (507 pages).
International Preliminary Report on Patentability for International Application No. PCT/US2016/019596, dated Sep. 7, 2018, 7 pages.
Office Action for European Application No. 16710866.1, dated Mar. 10, 2020, 5 pages.

* cited by examiner

TECHNIQUES FOR PROVIDING PROXIMITY SERVICES (PROSE) PRIORITY-RELATED INFORMATION TO A BASE STATION IN A WIRELESS NETWORK

CROSS-REFERENCE TO RELATED APPLICATIONS

This application is a national stage entry of PCT Application No. PCT/US2016/019596 filed Feb. 25, 2016, entitled "TECHNIQUES FOR PROVIDING PROXIMITY SERVICES (PROSE) PRIORITY-RELATED INFORMATION TO A BASE STATION IN A WIRELESS NETWORK" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations, which are referred to as evolved Node Bs (eNBs), provide wireless access within a coverage area or cell. In LTE, mobile devices, or mobile stations are referred to as a user equipment (UE). LTE has included a number of improvements or developments. 5G wireless networks are also being developed. In addition, device-to-device (D2D) or proximity services (ProSe) wireless communications may be performed in which a user device directly communicates with another user device.

SUMMARY

According to an example implementation, a method may include receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and allocating, by the base station based on the priority map, wireless resources to the relay user device to transmit data to the remote user device for one or more of the ProSe sidelink logical channels.

According to an example implementation, an apparatus may include at least one processor and at least one memory including computer instructions, when executed by the at least one processor, cause the apparatus to: receive, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and allocate, by the base station based on the priority map, wireless resources to the relay user device to transmit data to the remote user device for one or more of the ProSe sidelink logical channels.

A computer program product may include a non-transitory computer-readable storage medium and storing executable code that, when executed by at least one data processing apparatus, is configured to cause the at least one data processing apparatus to perform a method including: receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and allocating, by the base station based on the priority map, wireless resources to the relay user device to transmit data to the remote user device for one or more of the ProSe sidelink logical channels.

According to another example implementation, an apparatus may include means for receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and means for allocating, by the base station based on the priority map, wireless resources to the relay user device to transmit data to the remote user device for one or more of the ProSe sidelink logical channels.

According to an example implementation, a method may include determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and transmitting, by the relay user device, the priority map to the base station.

According to an example implementation, an apparatus may include at least one processor and at least one memory including computer instructions, when executed by the at least one processor, cause the apparatus to: determine, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and transmit, by the relay user device, the priority map to the base station.

A computer program product may include a non-transitory computer-readable storage medium and storing executable code that, when executed by at least one data processing apparatus, is configured to cause the at least one data processing apparatus to perform a method including: determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and transmitting, by the relay user device, the priority map to the base station.

According to another example implementation, an apparatus may include means for determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and means for transmitting, by the relay user device, the priority map to the base station.

The details of one or more implementations are set forth in the accompanying drawings and the description below. Other features will be apparent from the description and drawings, and from the claims.

DETAILED DESCRIPTION

Figure 1:
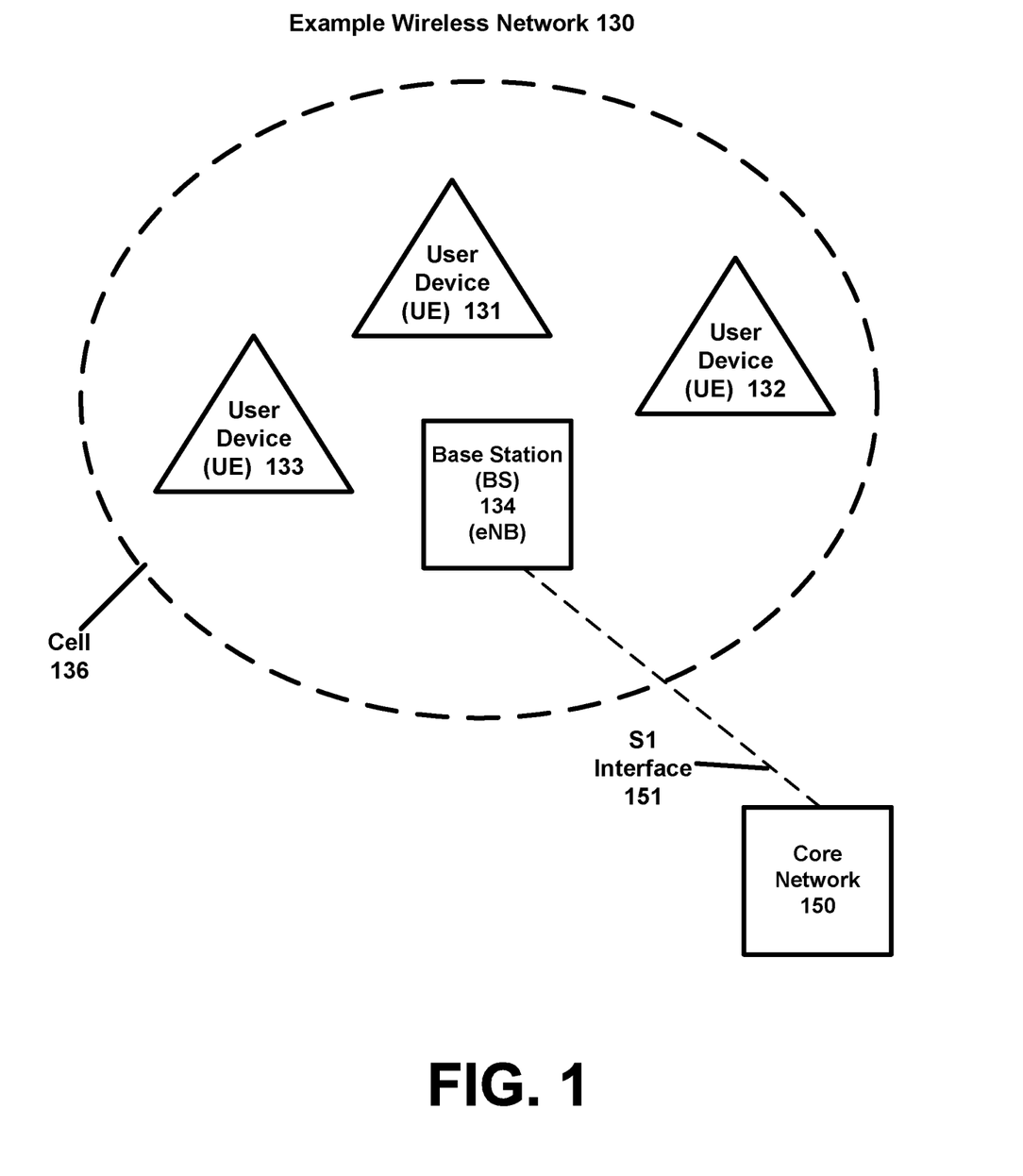
FIG. 1 is a block diagram of a wireless network according to an example implementation.

FIG. 1 is a block diagram of a wireless network 130 according to an example implementation. In the wireless network 130 of FIG. 1, user devices 131, 132 and 133, which may also be referred to as mobile stations (MSs) or user equipments (UEs), may be connected (and in communication) with a base station (BS) 134, which may also be referred to as an access node or an enhanced Node B (eNB), network node, access node or any other suitable apparatus. BS 134 provides wireless coverage within a cell 136. Although only three user devices are shown within cell 136 (connected or attached to BS 134), any number of user devices may be provided. BS 134 is also connected to a core network 150 via a base station-core network (BS-core network) interface 151. A BS-core network interface may also be referred to as, for example, a Si interface 151 or a backhaul connection. This is merely one simple example of a wireless network, and others may be used. According to an example implementation, at least part of the functionalities of a base station or (e)Node B (eNB) may be also be carried out by any node, server or host which may be operably coupled to a transceiver, such as a remote radio head.

According to an example implementation, a user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE, core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Only a few of the blocks or functions of the example core network are described, and the core network 150 may include different and/or additional blocks/functions, for example. LTE may be used as an example. However, the various implementations or techniques described herein may be applied to a 5G wireless network or other wireless networks, such as a wireless network in which one or more user devices may operate as a relay user device to relay data to a remote user device, for example.

According to an example implementation, user devices may operate in one of a plurality of communications modes, such as, for example: 1) a cellular communications mode in which a base station (or base stations) may provide wireless coverage via one or more cells, and communications (or data transfer) between user devices may occur through the BS. Thus, in a cellular communications mode, user devices may communicate via a BS. And, 2) a proximity services (ProSe) mode, also known as a device-to-device (D2D) mode, in which user devices may directly communicate with each other. ProSe communications between user devices may also be referred to as sidelink communications.

In some example implementations, a user device may operate as a relay user device (or relay UE) to relay (or forward) traffic between a BS and a remote user device that may be outside of the communication range of the BS. Thus, communication between a relay user device and a remote user device may occur via a ProSe sidelink logical channel, for example, which is a logical channel provided between ProSe devices.

Figure 2:
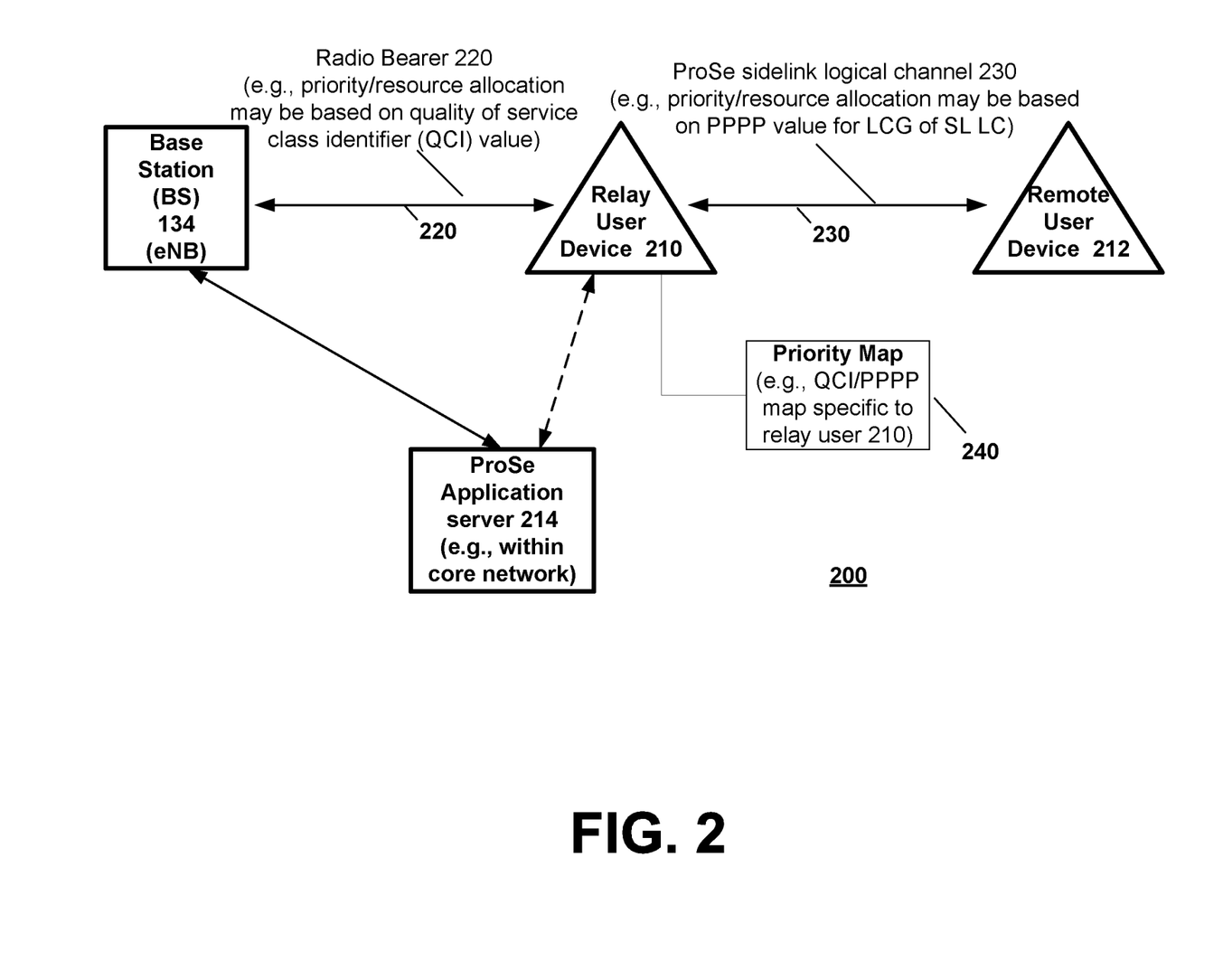
FIG. 2 is a block diagram of a wireless network that includes a relay user device according to an example implementation.

FIG. 2 is a block diagram of a wireless network that includes a relay user device according to an example implementation. Network 200 may include a BS 134, a relay user device (or relay UE) 210 and a remote user device (or remote UE) 212. In this illustrative example, remote user device 212 may be outside of the range of BS 134. Therefore, user device 210 may act as a relay user device 210 to relay or forward data or traffic between BS 134 and remote user device 212, for example.

Data or traffic may be communicated between BS 134 and relay user device 210 via one or more radio bearers, such as a radio bearer 220 provided between BS 134 and relay user device 210. A radio bearer may, for example, be a logical entity that may operate as a communications pipeline to transport packets or data between two or more points according to a specific QoS. Data (or packets) may be mapped to one of a plurality of bearers according to their (the packet's) quality of service (QoS) requirements. Each radio bearer may have a QoS class identifier (QCI) value that identifies a QoS class for that radio bearer, where the QCI value indicates performance (or QoS) characteristics of the radio bearer. QCI values may indicate a set of performance characteristics, such as, for example, a resource type, priority, packet delay budget, acceptable range for packet error loss rate, etc. Two example QCI values may include (by way of illustrative examples):

QCI=1: Resource Type=GBR, Priority=2, Packet Delay Budget=100 ms, Packet Error Loss Rate=$10^{-2}$, Example Service=Voice QCI=9: Resource Type=Non-GBR, Priority=9, Packet Delay Budget=300 ms, Packet Error Loss Rate=$10^{-6}$, Example Service=Internet According to an example implementation, the BS 134 may allocate wireless (or radio) resources to serve one or more radio bearers based upon the QCI values of each radio bearer. For example, when wireless resources may become scarce, the BS 134 may prioritize the allocation of wireless resources for the transmission of data between BS 134 and relay user device 210 for higher priority radio bearers (e.g., QCI value=1), while lower priority (e.g., QCI value=9) radio bearers may receive fewer or less frequent wireless resources. Or, in another example implementation, BS 134 may first allocate wireless resources to high priority (e.g., QCI value=1) radio bearers, and then secondly, may allocate wireless resources to lower priority radio bearers. In this manner, BS 134 may prioritize the allocation of wireless resources based on the QCI (or QoS requirements) of the different radio bearers, for example. QCI (or quality of service), e.g., the set of QCI values, is an example of a set of priority classes, and other types of priority classes may also be used to prioritize the allocation of resources for the different radio bearers.

Relay user device 210 may communicate with remote user device 212 via one or more ProSe sidelink logical channels. ProSe per packet priority (PPPP) is set by a higher layer (ProSe application control) for each packet being passed down from the higher layer to the lower layer (L2) of ProSe D2D radio interface (PC5) at ProSe transmitting user device. PPPP may identify QoS characteristics (or QoS requirements) for each packet. In an expectable operation, packets which are assigned with same PPPP are mapped to 1 ProSe sidelink logical channel and therefore a logical channel is associated with a PPPP. A PPPP value may be mapped to a ProSe sidelink logical channel. According to an example implementation, for each ProSe destination (e.g., for remote user device 212), each ProSe sidelink logical channel is mapped to one of a plurality of (e.g., one of four) logical channel groups (LCGs), depending on the ProSe per packet priority (PPPP) mapped to the ProSe sidelink logical channel. Thus, based on the PPPP to logical channel mapping, a PPPP value may identify a priority (or other QoS characteristics, or a set of QoS performance characteristics) of the logical channel group. While PPPP values may be used to identify a priority (or QoS characteristics) for each of the ProSe sidelink logical channels, other (or different) sets of priority classes may be used for this purpose. Thus, according to an example implementation, the BS 134 may allocate/schedule wireless resources for the transmission of data/traffic over one or more of the ProSe sidelink logical channels based on the PPPP values of the sidelink logical channels (or, in other words, based on the PPPP value mapped to the sidelink logical channel group for each of the ProSe sidelink logical channels). In this manner, BS 134 may allocate wireless resources among the ProSe sidelink logical channels based on PPPP values mapped to (or for) each sidelink logical channel.

According to an example implementation, a ProSe application server 214 (e.g., which may provided as part of core network 150) may determine and then transmit (via BS 134) to relay user device 210 a priority map 240. A ProSe application may be running on ProSe application server 214.

According to another illustrative example implementation, the priority map 240 may indicate a mapping (or correspondence) of a set of quality of service class identifier (QCI) values for one or more radio bearers provided between the base station and a relay user device and a second set of proximity services (ProSe) per packet priority (PPPP) values for (mapped to) one or more proximity services (ProSe) sidelink logical channels provided between the relay user device and a remote user device. In an example implementation, QCI and PPPP may be examples of priority classes (or priority class indicators), and other priority classes may be used.

The priority map 240 may be specific to an application, and/or may be specific to a relay user device 210, e.g., each relay user device may include (or may be pre-configured with) its own specific priority map 240, according to an example implementation. That is, according to an example implementation, each relay user device may use a different mapping or correspondence between QCI values for bearer traffic (e.g., between BS 134 and relay user device 210) and PPPP values for sidelink logical channel traffic (e.g., for one or more sidelink logical channels between relay user device 210 and one or more remote user devices).

According to an example implementation, BS 134 may schedule wireless resources for both the radio bearer 220 (or one or more radio bearers) and the ProSe sidelink logical channel 230 (or for one or more sidelink logical channels). Thus, for example, BS 134 may allocate/schedule wireless resources for a radio bearer 220 and a sidelink logical channel for downlink traffic/data transmitted from BS 134 to remote user device 212 via relay user device 210.

However, in some situations, resource scheduling problems/difficulties may arise due to the BS 134 not having (or knowing) the priority map 240 for one or more relay user devices (such as for relay user device 210). In the absence of knowing or receiving the priority map 240, the BS 134 will not typically know how QCI values and PPPP values compare to each other (with respect to the relay user device 210), or how these QCI values/PPPP values have been mapped by the relay user device 210. Thus, for example, in the absence of knowing/having the priority map, the BS 134 may not know whether the mapping at the relay user device 210 between the PPPP values and the assigned logical channel group for each of the sidelink logical channels is in line (or consistent) with the mapping at the BS 134 between the QCI values and the logical channel group assigned for each of the radio bearers on which the corresponding sidelink logical channels are carried or mapped on.

For example, due to the BS 134 not having the priority map 240 (mapping from QCI values to PPPP values), BS 134 may not accurately prioritize or schedule the allocation of wireless resources for one or more ProSe sidelink logical channels for relay user device 210. In other words, there may be a mismatch in priority handling by BS 134 of the same traffic sent on radio bearer 220 and then forwarded via ProSe sidelink logical channel 230 to remote user device 212, because the BS does not have the priority map 240. Thus, while the BS 134 may be able to prioritize or schedule traffic among different radio bearers based on the QCI values for the radio bearers, and may be able to prioritize or schedule traffic among different ProSe sidelink logical channels, the BS may not consistently (or properly) prioritize or schedule traffic among (or between) the radio bearers and sidelink logical channels. To the extent a same set of wireless resources may be used for both a radio bearer(s) and a sidelink logical channel(s), the BS 134 may not be able to compare relative priorities of radio bearers vs. priorities of sidelink logical channels. For example, such an uninformed and/or inconsistent approach to wireless resource scheduling by BS 134 may provide an inconsistent end-to-end QoS handling of same data/traffic that is transmitted to the relay user device 210 and then forwarded by relay user device 210 to remote user device 212.

In an illustrative example, BS 134 may receive data to be transmitted via radio bearer 1 to relay user device 210, where such data will then be forwarded/relayed by relay user device 210 via ProSe sidelink logical channel 2 (or a logical channel mapped to logical channel group 2). BS 134 detects a QCI value=1 for radio bearer 1, and without priority map 240, BS 134 does not know what PPPP value is used by relay user device 210 for this same data/traffic (QCI value=1). However, the priority map 240, stored by relay user device 210, may indicate that QCI value 1 maps (or corresponds) to a high priority PPPP value. Therefore, in this example, such as in case of cell congestion, BS 134 prioritizes and schedules sufficient wireless resources for the downlink transmission of this data over radio bearer 1 from BS 134 to relay user device, but does not sufficiently (for example) prioritize the scheduling of resources at the corresponding sidelink logical channel. Thus, in this case, at least some of the traffic/data are successfully transmitted to the relay user device 210, but then may expire (become stale) and are dropped by relay user device 210 because insufficient wireless resources were scheduled/allocated for the relay user device 210 to transmit/forward this traffic to the remote user device 212 over the sidelink logical channel. This is merely one illustrative example where a mismatch in scheduling or prioritizing of resources may occur for a radio bearer(s) and sidelink logical channel(s). The opposite situation may also occur, e.g., where the BS 134 may over-schedule (or over-prioritize) wireless resources for a sidelink logical channel, which may deprive other bearers or logical channels of sufficient resources in some cases.

As another example, if BS 134 does not know that a sidelink logical channel with certain PPPP (e.g., PPPP=1) is derived from certain QCI (e.g., QCI value=1) of the radio bearer, the BS 134 may prioritize the radio bearer with priority level=1 (QCI value=1, which may be high priority in this example) in the resource allocation, but not prioritize the sidelink logical with PPPP=1 in case of congestion. Then the relay user device 210 may obtain a downlink (DL) grant) of resources for relayed DL traffic over the Uu interface (BS to relay user device via radio bearer), but does not obtain a sidelink grant of wireless resources for transmitting the relayed DL traffic from the relay user device 210 to remote user device 212 over the PC5 interface (relay user device to remote user device). Thus, in this example, because allocation of relay sidelink logical channel resources are not sufficiently prioritized (and thus, are not obtained, e.g., due to congestion), the resources used for DL transmission to the relay user device 210 are basically wasted and end-to-end QoS is not retained for the traffic that is directed to the remote user device 212. Thus, in this example, for a VoIP (Voice over Internet Protocol) call to remote user device 212, the QoS of the VoIP call suffers due to dropped packets at the relay user device 210.

In another example implementation, a home network may provision the Relay user device 210 that QCI-70 "Mission Critical Data" is mapped with the highest PPPP value for transmission over the PC5 interface (from relay user device to remote user device). This may mean, for example, that during PC5 congestion, the relay user device 210 will first send the data received from BS 134 for a QCI-70 bearer before delivering other (lower priority) QCI data. However in this example, other QCI values, QCI-x (x=1, 2, 3, 4, 65, 66, 5, 69) may have a higher priority level than QCI-70. This means, for example, that during congestion, BS 134 will first try to meet the resources required for the higher priority QCI-x traffic on the Uu (radio bearer) side rather than for QCI-70. At this point, there is a mismatch in priority handling between radio bearer and sidelink logical channel.

Also, in some cases, one or more radio bearers (provided between BS 134 to one or more relay user devices) and one or more sidelink logical channels (from a relay user device 210 to one or more remote user devices) may share the same spectrum/wireless resources. Therefore, in this case, there may be competition among radio bearers and sidelink logical channels for wireless/radio resources that are scheduled by BS 134. Thus, without having the priority map 240, BS 134 may inadvertently prioritize scheduling of resources to a lower-priority need, and omit scheduling wireless resources to a higher priority need, e.g., as between a radio bearer(s) and a ProSe sidelink(s).

Therefore, according to an example implementation, the priority map 240 may be provided (or sent/transmitted) to the BS 134. Various techniques may be used to send or provide the priority map to the BS 134, as described in greater detail below. BS 134 may then allocate wireless resources to one or more radio bearers and/or one or more ProSe sidelink logical channels based on the priority map 240. As noted, according to an illustrative example implementation, priority map 240 may indicate a mapping of a set of quality of service class identifier (QCI) values for one or more radio bearers provided between the base station and a relay user device and a second set of proximity services (ProSe) per packet priority (PPPP) values for one or more proximity services (ProSe) sidelink logical channels provided between the relay user device and a remote user device.

According to an example implementation, BS 134 may receive priority map 240 (e.g., for or specific to relay user device 210) from relay user device 210. For example, relay user device 210 may be preconfigured with the priority map 240 (e.g., receive and store the priority map 240), such as being configured with the priority map 240 during manufacturing, during a configuration operation, or during another time. Or, relay user device 210 may receive the priority map from a ProSe application server 214 and/or from core network 150. Then, relay user device 210 may transmit the priority map 240 to the BS 134.

Or, in another example implementation, the relay user device 210 may receive from BS 134 a request for the priority map 240, and then relay user device 210 may transmit the priority map 240 to the BS 134 in response to the request.

Or, yet in another example implementation, the relay user device 210 may receive, from the BS 134, a request or an indication for the relay user device 210 to transmit the priority map 240 to the BS 134 if one or more trigger conditions are met (e.g., the BS 134 including an indication of such trigger conditions within the request or indication message sent to the relay user device 210). The relay user device 210 may then determine that the one or more trigger conditions have been met. The relay user device 210 may then transmit, in response to the one or more trigger conditions being met, the priority map 240 to the BS 134. Some example trigger conditions may include the relay user device 210 beginning to operate as a relay user device to relay (or being requested to relay) data to a remote user device 212 and/or the relay user device having data to be relayed (acting as a relay user device) to a remote user device 212, where the data is for a ProSe sidelink logical channel having a PPPP value (or other priority class) that is a threshold priority level or greater (e.g., PPPP values of 1, 2 or 3). The trigger conditions may also consider priorities or logical channel groups assigned for individual radio bearers provided between the base station and a relay user device and/or for individual sidelink logical channels provided between the relay user device and a remote user device: e.g., including considering whether there are different values and/or whether the value(s) exceed(s) some pre-configured corresponding threshold(s). In response to the relay user device 210 detecting that the priority map trigger conditions have been met, the relay user device 210 may then send the priority map 240 to the BS 134.

Alternatively, BS 134 may receive priority map 240 from core network 150, such as from a ProSe application/ProSe application server 214, or other application or block or function within core network 150. This may be triggered when relay user device 210 starts actively relaying with or without a request from BS 134 towards core network 150. Alternatively, BS 134 may receive priority map 240 for relay user device 210 from another BS (a source BS), e.g., with or as part of a handover request (or as part of messages exchanged for handover preparation) for the handover of relay user device 210 from a source BS to BS 134 (to a target BS).

According to an example implementation, the BS 134 may determine a sidelink logical channel group (LCG)/ProSe per packet priority (PPPP) map that indicates a mapping for one or more sidelink logical channel groups to one or more PPPP values. The BS 134 may provide this logical channel group/PPPP map to the relay user device 210. For example, each of the four logical channel groups may be mapped to one or more of eight PPPP values. Also, the BS 134 may receive the priority map 240, which provides, for example, the QCI/PPPP mapping for relay user device 210, for example. BS 134 may receive an indication of queued data in a buffer status report, from the relay user device 210 for a first logical channel group of the ProSe sidelink logical channel. BS 134 may allocate/schedule, in response to the buffer status report and based on the priority map 240, wireless resources to the relay user device 210 to transmit data to the remote user device 212 for the first logical channel group.

Thus, in an example implementation, based on the QCI/LCG mapping that the BS 134 controls, and based on the received PPPP/QCI mapping (priority map 240) of the relay user device 210, the BS 134 may determine: how the mapping between PPPP and LCG is currently carried out at the relay user device 210; if the current LCG/PPPP mapping of the relay user device 210 is coherent to (or consistent with) the QCI/LCG mapping of the BS 134. If this is true (the current LCG/PPPP mapping of the relay user device 210 is coherent to or consistent with the QCI/LCG mapping of the BS 134), then no further action is needed by BS 134. Else, if the current LCG/PPPP mapping of the relay user device 210 is not coherent to (not consistent with) the QCI/LCG mapping of the BS 134, the BS 134 may reconfigure LCG or LCG/PPPP mapping or QCI/PPPP mapping for relevant sidelink logical channel(s) or the relay user device 210 for an example to make the priority mapping and handling be consistent between the relay user device 210 and the BS 134.

According to an example implementation, the serving BS 134 may control the QCI/LCG mapping for individual radio bearers. The serving BS 134 is made aware of and is permitted to control (override) the PPPP/QCI mapping (priority map 240) at individual relay user device 210. The serving BS 134 may determine (or derive) actual PPPP/LCG mapping for an individual relay user device 210 based on knowledge of the LCG/CQI mapping it (BS 134) controls and the indicated PPPP/CQI mapping (priority map 240, provided to BS 134) of the relay user device 210. The serving BS 134 may then reconfigure PPPP/LCG or PPPP/QCI mapping at the relay user device, to be consistent with QCI/LCG mapping of the BS 134.

Therefore, the priority map 240, in addition to the buffer status report (or resource request), may be used by the BS 210 to allocate or schedule wireless resources for a specific sidelink logical channel/sidelink logical channel group coherently and consistently to provide or enhance QoS for ProSe UE-to-Network relays (such as relay user device 210) illustrated in FIG. 2. Thus, for example, the BS 134 may map the sidelink logical channel group of the BSR to the corresponding PPPP value(s). And then, for example, the BS 134 may determine the corresponding QCI value (corresponding to the PPPP value), so that the wireless resources for the requested sidelink logical channel group (ProSe sidelink logical channel) may be correctly prioritized. That is, the priority (PPPP value) associated with the ProSe sidelink logical channel/logical channel group may be compared to corresponding priorities (QCI values) of radio bearer(s) based on the priority map 240, to prioritize the allocation/scheduling of resources among radio bearers and sidelink logical channels, e.g., so that wireless resources may be first scheduled for higher priority needs. The priority map 240, thus, may be used by BS 134 to more consistently prioritize wireless resources among the radio bearer(s) and ProSe sidelink logical channel(s), and thereby provide a more consistent end-to-end QoS handling for data transmitted from BS 134 to a remote user device 212 via relay user device 210, for example.

In addition to scheduling resources for a ProSe sidelink logical channel in response to a resource request (e.g., buffer status report) from the relay user device 210, the BS 134 may use the priority map 240 to prioritize the scheduling of wireless resources for traffic received by BS 134 that is to be sent to relay user device 210 and then forwarded to remote user device 212. For example, BS 134 may receive traffic/data for radio bearer 1 with a QCI value. Based on the priority map, BS 134 can determine the PPPP value corresponding to the QCI value of the received traffic. The BS 134 may then allocate or schedule wireless resources to allow the relay user device 210 to relay or forward such traffic/data from the relay user device 210 to remote user device 212, for example. In this manner, based on the priority map 240, BS 134 may consistently prioritize (e.g., using a same or similar scheduling priority, such as high priority, or low priority, based on the QCI/PPPP values) the scheduling of both radio bearer resources and ProSe sidelink logical channel resources to allow a same data/traffic to be sent end-to-end from BS 134 to remote user device 212 via resources scheduled using a consistent or same (or at least similar) scheduling priority.

Thus, according to an example implementation, the BS 134 may determine a quality of service class identifier (QCI) value for a first radio bearer. The BS 134 may receive data for transmission to the relay user device 210 via the first radio bearer provided between BS 134 and the relay user device 210. The BS 134 may determine, based on the priority map 240, the ProSe per packet priority (PPPP) value that maps (or corresponds) to the QCI value for the first radio bearer. The BS 134 may allocate or schedule, based on the PPPP value of the received data (or PPPP value corresponding to QCI value of received data), wireless resources to the relay user device 210 to transmit this received data to the remote user device 212 via the sidelink logical channel.

In yet another example implementation, the BS 134 may receive traffic to be forwarded to the remote user device 212 via the relay user device 210. BS 134 may prioritize, based on the priority map 240, an allocation/scheduling of wireless resources for the one or more radio bearers and the one or more proximity services (ProSe) sidelink logical channels. And, the BS 134 may allocate/schedule, based on the prioritizing, a first set of wireless resources to allow the received traffic to be transmitted from the BS to the relay user device over a first radio bearer of the one or more radio bearers, and a second set of wireless resources to allow the (same) received traffic to be transmitted from the relay user device 210 to the remote user device 212 via a first proximity services (ProSe) sidelink logical channel of the one or more proximity services (ProSe) sidelink logical channels.

Figure 3:
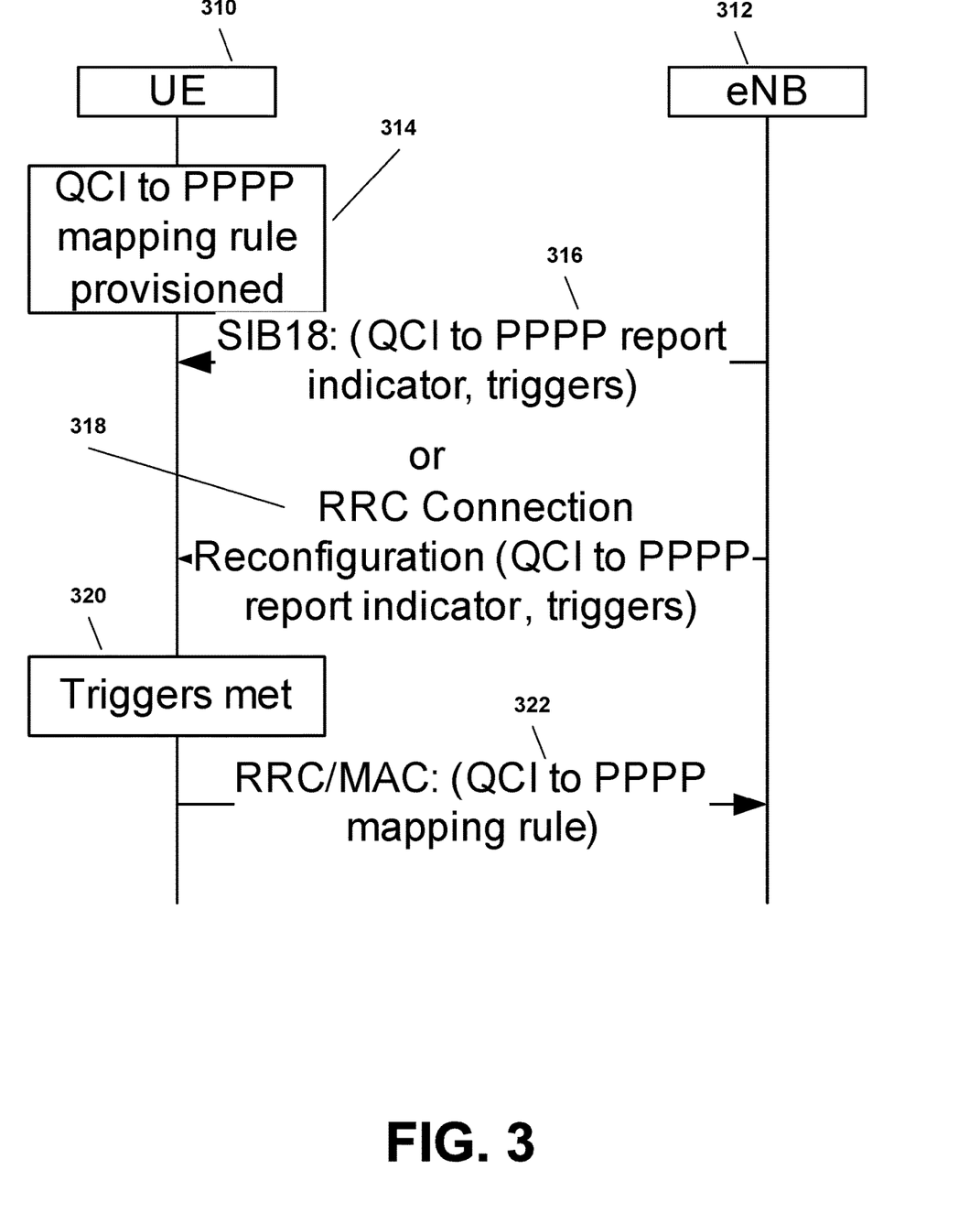
FIG. 3 is a diagram illustrating communication of a priority map 240 to a base station/eNB according to an example implementation.

FIG. 3 is a diagram illustrating communication of a priority map 240 to a base station/eNodeB (eNB) according to an example implementation. A relay user device (relay UE) 310 is in communication with a BS/eNB 312. At 314, the relay UE 310 is provisioned with priority map 240 (where the priority map 240 may also be referred to as QCI to PPPP mapping rules). For example, relay user device (rely UE) 310 may receive the priority map 240 during manufacturing or configuration/setup, and/or ProSe application server 214 may send/transmit the priority map 240 to relay UE 310. At 316, eNB 312 may send (e.g., broadcast in a system information block (SIB)) a request for a QCI-to-PPPP report/mapping rules (a request for priority map 240) to one or more UEs/user devices, such as to relay UE 310. The request sent at 316 may indicate one or more triggers/trigger conditions that should cause the relay UE to send its priority map (QCI-to-PPPP mapping rules) to the eNB 312. Alternatively, at 318, the eNB may send, via dedicated signaling to relay user device (relay UE) 310 (e.g., via a radio resource control (RRC) message), the request for the priority map 240/QCI-to-PPPP mapping rules, and the one or more trigger conditions.

Some example trigger conditions may include, for example: that the relay UE 310 is operating as a relay UE; or has relay data to send that is a minimum or threshold priority; or has a minimum signal quality (e.g., meets a threshold reference signal received power (RSRP)) on the Uu interface between eNB 312 and relay UE 310. for a relay UE should be reported to the eNB/BS. For example, the BS/eNB may determine when the cell load reaches a threshold, and then sends a request to relay UE for the priority map 240, which the relay UE then responds to, without use of trigger conditions (in such case, the determining to send or provide priority map is performed by the eNB/BS, rather than by the relay UE).

At 320, the relay UE determines that the one or more triggers/trigger conditions are met, and then at 322, the relay UE 310 sends its priority map 240 (its QCI-to-PPPP mapping rules) to eNB 312. eNB 312 may then use the priority map 240 to prioritize the allocation/scheduling of wireless resources for one or more radio bearers and/or one or more ProSe sidelink logical channels.

Also, for example, cell load or cell interference for eNB 312, and/or traffic distribution between radio bearers and sidelink logical channels may be considered (e.g., by the eNB/BS) when determining whether or not the priority map 240 (QCI-to-PPPP mapping rules) should be provided/indicated by relay UE (relay user device) to eNB/BS 312.

In one embodiment, the relay user device (relay UE) is configured with broadcasted system information that indicates whether the relay user device (relay UE) should report its QCI-to-PPPP mapping rules (priority map 240) to the BS/eNB. The configuration may be as simple as one bit indicator in a SIB (system information block that is broadcast by BS/eNB) to indicate to relay user device (relay UE) whether or not the mapping rule report (priority map 240) should be reported to BS/eNB. In a more advanced configuration, the configuration of the relay user device (relay UE) may involve reporting triggers, e.g., as one example trigger, a relay user device (relay UE) that relays traffic with certain QCI or PPPP (e.g., minimum or threshold QCI or PPPP) may/should report the mapping rule (priority map 240), or a relay user device (relay UE) with certain capability may report the mapping rule, or the relay user device (relay UE) with certain Uu link quality (e.g., defined by RSRP/RSRQ) may report the mapping rule/priority map 240 to BS/eNB.

In one embodiment, the configuration to the relay user device (relay UE) on reporting QCI to PPPP mapping rule (priority map 240) is configured with dedicated signaling. The BS/eNB may determine to configure the Relay UEs for reporting of QCI to PPPP mapping rule based on either relay user device (relay UE) capability or the QCI of relayed traffic or other radio bearer traffic of the relay user device (relay UE), or BS/eNB may provide the QCI of relayed traffic as reporting triggers in the dedicated configuration message send to relay user device (relay UE).

In one embodiment, for both common (e.g., broadcasted request for priority map 240) and dedicated (e.g., sending a dedicated request for priority map 240) configuration options, the BS/eNB may also take into account the cell load and/or the traffic distribution between radio bearer traffic and sidelink traffic to determine if the QCI to PPPP mapping rule report is configured to the relay user devices (relay UEs) or not (to determine if the BS/eNB will request priority map from one or more relay UEs). In one embodiment, the mapping rule may be reported by the relay user device (relay UE) with either RRC (radio resource control) or MAC (media access control) control signaling.

In one embodiment/implementation, if there are only a limited number of different mapping rules/priority maps 240 supported in the network and each mapping rule/priority map has an unique index/identifier, the eNB may learn the set of the mapping rules based on the reports from one or more Relay UEs, and the eNB may configure the other Relay UEs (e.g., the later arriving UEs) to report only the mapping rule index/identifier (e.g., where relay UE would only report a priority map index to identify a particular priority map). Therefore, a priority map 240 or mapping rules may be identified (out of a number of possible priority maps) based on a priority map index, for example, which may reduce overhead in some cases.

In one embodiment, the mapping rule/priority map may be used by the eNB to re-map the PPPP or scheduling priority associated with a sidelink BSR (buffer status report) for certain sidelink logical channel groups to the QCI and therefore schedule the resource for radio bearer and sidelink logical channels according to the common priority handling information (i.e., QCI). The eNB may also configure the mapping of PPPP and logical channel group coherently/consistently with the mapping of QCI and PPPP (priority map 240) to guarantee (or prioritize) the QoS of the relayed traffic with highest priorities. Thus, according to an example implementation, The BS/eNB may configure the PPPP/LCG mapping in the relay user device (relay UE). If the BS/ENB obtains the PPPP/QCI mapping (priority map 240), the BS may choose to remap (or modify the mapping of) the PPPP/LCG to effectively cause the relay user device (relay UE) to map a QCI value to a given LCG. For example, if the BS/eNB did this for multiple, or even all known relay user devices (relay UEs), the BS/eNB would know what LCG each QCI would end up in, and the BS/eNB would not have to determine per UE which LCG had the highest priority traffic.

Figure 4:
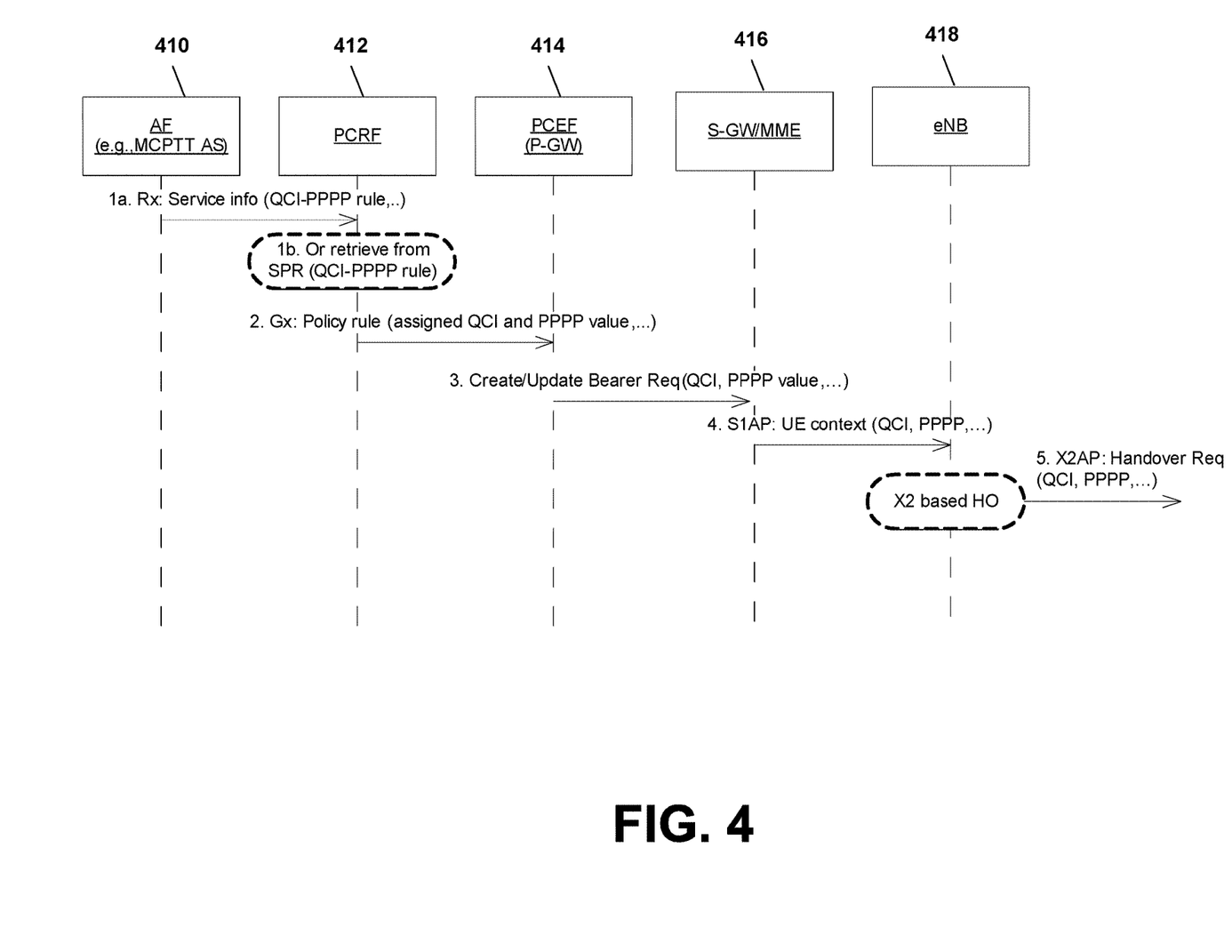
FIG. 4 is a diagram illustrating providing a priority map to a base station/eNB from the core network according to an example implementation.

FIG. 4 is a diagram illustrating providing a priority map to a base station/eNB from the core network according to an example implementation. Within the core network 150, a Policy Control and Charging (PCC) functionality includes an Application Function (AF), a Subscription Profile Repository (SPR), a Policy and Charging Rules Function (PCRF) 412, a Policy and Charging Enforcement Function (PCEF) 414, a serving gateway (S-GW) and a Mobility Management Entity (MME) 416. At operation 1a, AF 410 may obtain a priority map 240 from the ProSe application (which may be provided on a ProSe application server 214), and then the AF may forward the priority map 240 (or QCI-PPPP mapping rules) to PCRF 412. At operation 1b, PCRF 412 receives the priority map 240 (or QCI-PPPP mapping rules), from either AF 410 or retrieves the priority map from SPR. At operation 2, PCRF 412 may send a Policy rule including priority map 240 (or QCI-PPPP mapping rules) to PCEF 414. At operation 3, PCEF 414 (or packet/data gateway) sends a create/update bearer request (including the priority map 240 (or QCI-PPPP mapping rules)) to S-GW/MME 416. At operation 4, S-GW/MME 416 sends UE context for the relay UE, including the priority map 240 (or QCI-PPPP mapping rules), to the eNB/BS 418. In the event of a handover of the relay UE, the eNB (e.g., as source BS/eNB) may send a handover request (including the priority map 240 (or QCI-PPPP mapping rules) to a target BS/eNB, for example.

In one illustrative example implementation with respect to the techniques illustrated in FIG. 4, the core network (e.g., S-GW/MME may send the UE contact for the relay UE, including the priority map 240 for the relay UE/relay user device, if one or more trigger conditions are met. Also, with respect to FIG. 4, the source eNB/source BS may send the priority map 240 for the relay UE to the target eNB/target BS if one or more trigger conditions are met. Some example trigger conditions may include, by way of illustrative examples, the relay UE/relay user device beginning to operate as a relay to relay (or being requested to relay) data to a remote user device/UE, and/or the relay user device having data to be relayed (acting as a relay user device) to a remote user device 212, e.g., where the data is for a ProSe sidelink logical channel having a PPPP value (or other priority class) that is a threshold priority level or greater (e.g., PPPP values of 1, 2 or 3). The trigger conditions may also consider priorities or logical channel groups assigned for individual radio bearers provided between the base station and a relay user device and/or for individual sidelink logical channels provided between the relay user device and a remote user device: e.g., including considering whether there are different values and/or whether the value(s) exceed (s) some pre-configured corresponding threshold(s). Another example of a trigger may include whether a cell has a threshold level of congestion or connected user device, which may include one or both of a source and/or target BS for the handover example.

In one embodiment, a "local PPPP" value can be assigned by PCRF 412 to allow the eNB 418 to determine the relative priority PPPP level between the active/ongoing QCI(s) for the Relay UE. The QCI to PPPP mapping rule (priority map 240) can be provided by Application Server (AS) (e.g., Mission Critical Push to Talk Application server (MCPTT AS) using the Rx (receive interface) to PCRF 412, or PCRF 412 can retrieve the priority map 240 from the SPR via Sp interface. According to an example implementation, PCRF 412 is the entity assigning the QCI value to be used in the serving PLMN (public land mobile network). Based on the local operator policy and the received mapping rule from the AS, PCRF 412 may also assigns a "local PPPP" value for the assigned QCI. This "local PPPP" value and the assigned QCI is transferred to eNB based on existing Gx and EPC session signaling, for example. The eNB retains the relationship for each QCI-x bearer and their assigned "local PPPP" value that is active/ongoing. Based on this relationship, eNB can be aware of the relative PPPP level for each active QCI of the relay UE. In one example implementation, upon obtaining the QCI to "local PPPP" relationship, the BS/eNB may provide such QCI to PPPP mapping rule (priority map 240) to override the mapping rule provisioned to the relay user device/relay UE. This example embodiment can eliminate the need of the provisioning the mapping rule to the Relay UE from HPLMN.

Figure 5:
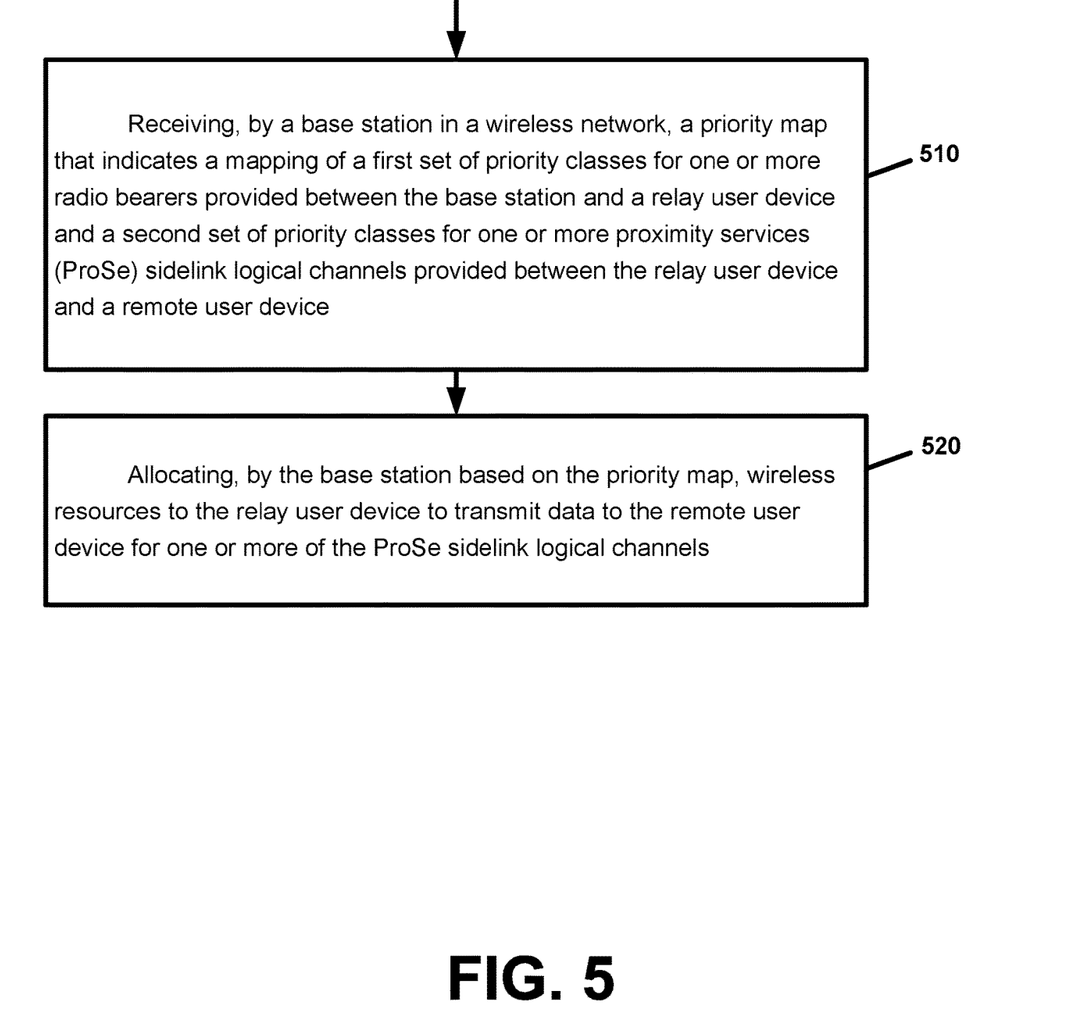
FIG. 5 is a flow chart illustrating operation of a base station according to an example implementation.

FIG. 5 is a flow chart illustrating operation of a base station according to an example implementation. Operation 510 includes receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device. Operation 520 includes allocating, by the base station based on the priority map, wireless resources to the relay user device to transmit data to the remote user device for one or more of the ProSe sidelink logical channels.

According to an example implementation of the method of FIG. 5, the receiving may include receiving, by the base station, the priority map from the relay user device; or, receiving, by the base station, the priority map from a core network.

According to an example implementation of the method of FIG. 5, the receiving may include receiving, by the base station, the priority map within a handover request for the relay user device or as part of handover preparation for the relay user device.

According to an example implementation of the method of FIG. 5, the priority map may include: a priority map that indicates a mapping of a set of quality of service class identifier (QCI) values for one or more radio bearers provided between the base station and a relay user device and a second set of proximity services (ProSe) per packet priority (PPPP) values for one or more proximity services (ProSe) sidelink logical channels provided between the relay user device and a remote user device.

According to an example implementation of the method of FIG. 5, each of the sidelink logical channels is mapped to one of a plurality of logical channel groups depending on the ProSe per packet priority (PPPP) value of the sidelink logical channel.

According to an example implementation of the method of FIG. 5, the priority map is specific to the relay user device.

According to an example implementation of the method of FIG. 5, and further including receiving, by the base station, an indication of queued data in a buffer status report, from the relay user device for a first logical channel group of the ProSe sidelink logical channels; and allocating, by the base station in response to the buffer status report and based on the priority map, wireless resources to the relay user device to transmit data to the remote user device for the first logical channel group.

According to an example implementation of the method of FIG. 5, the method may further include determining a quality of service class identifier (QCI) value for a first radio bearer of the one or more radio bearers; receiving, by the base station, data for transmission to the relay user device via the first radio bearer of the one or more radio bearers provided between the base station and the relay user device; determining, based on the priority map, the ProSe per packet priority (PPPP) value that maps to the QCI value for the first radio bearer; and allocating, by the base station based on the determined PPPP value of the received data, wireless resources to the relay user device to transmit data to the remote user device.

According to an example implementation of the method of FIG. 5, the method may further include receiving, by the base station, traffic to be forwarded to the remote user device via the relay user device; prioritizing, by the base station based on the priority map, an allocation of wireless resources for the one or more radio bearers and the one or more proximity services (ProSe) sidelink logical channels; and, allocating, by the base station based on the prioritizing, a first set of wireless resources to allow the received traffic to be transmitted from the base station to the relay station over a first radio bearer of the one or more radio bearers, and a second set of wireless resources to allow the received traffic to be transmitted from the relay user device to the remote user device via a first proximity services (ProSe) sidelink logical channel of the one or more proximity services (ProSe) sidelink logical channels.

According to an example implementation of the method of FIG. 5, the method may further include determining, by the base station, a need of reconfiguration for the relay user device based on the priority map in relation with quality of service class identifier (QCI) and sidelink logical channel group (LCG) priority mapping of the base station; and reconfiguring the relay user device with a new sidelink logical channel group for one or more sidelink logical channels.

According to an example implementation, an apparatus may include at least one processor and at least one memory including computer instructions, when executed by the at least one processor, cause the apparatus to: receive, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and allocate, by the base station based on the priority map, wireless resources to the relay user device to transmit data to the remote user device for one or more of the ProSe sidelink logical channels.

A computer program product may include a non-transitory computer-readable storage medium and storing executable code that, when executed by at least one data processing apparatus, is configured to cause the at least one data processing apparatus to perform a method including: receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and allocating, by the base station based on the priority map, wireless resources to the relay user device to transmit data to the remote user device for one or more of the ProSe sidelink logical channels.

According to another example implementation, an apparatus may include means (e.g., 702A/702B and/or 704, FIG. 7) for receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device; and means (e.g., 702A/702B and/or 704, FIG. 7) for allocating, by the base station based on the priority map, wireless resources to the relay user device to transmit data to the remote user device for one or more of the ProSe sidelink logical channels.

Figure 6:
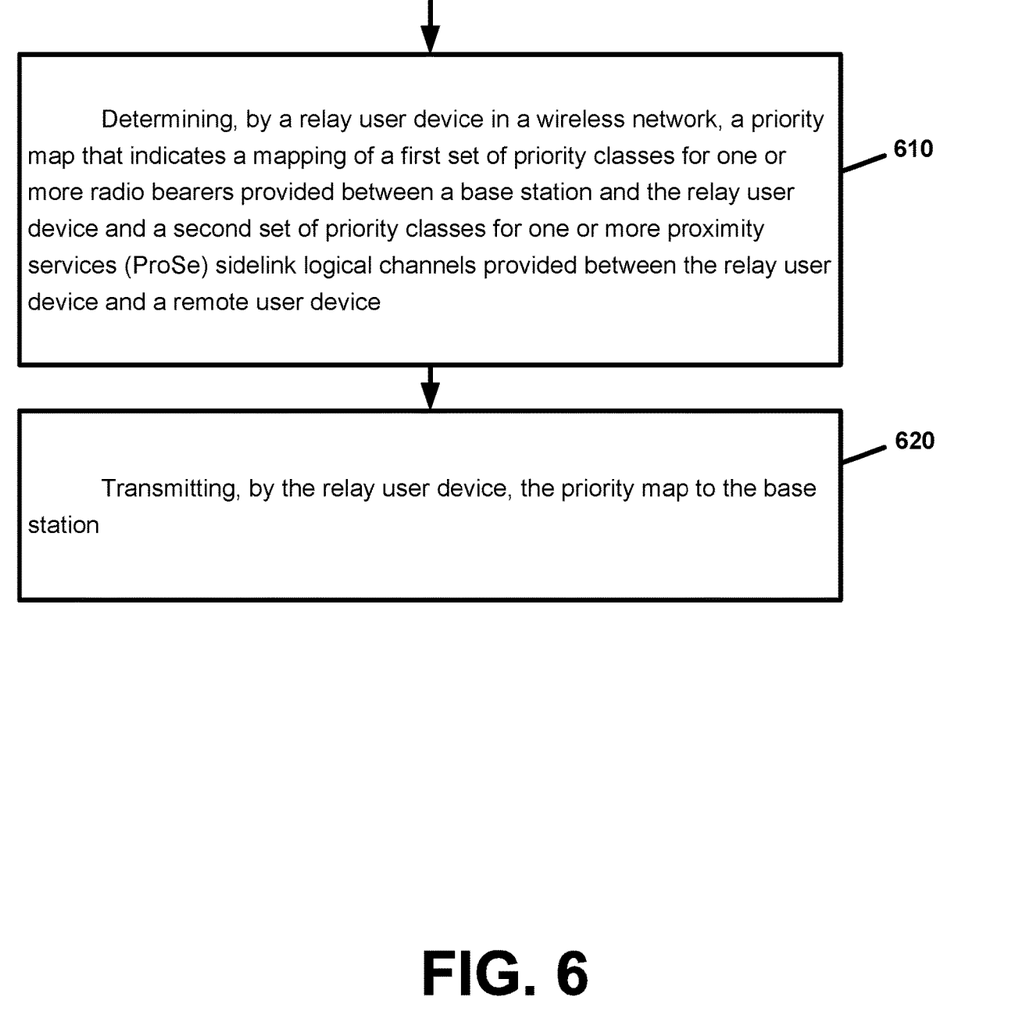
FIG. 6 is a flow chart illustrating operation of a relay user device according to an example implementation.

FIG. 6 is a flow chart illustrating operation of a relay user device according to an example implementation. Operation 610 includes determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device. Operation 620 includes transmitting, by the relay user device, the priority map to the base station.

According to an example implementation of the method of FIG. 6, the determining may include receiving, by the relay user device, the priority map from a proximity services (ProSe) application or a core network.

According to an example implementation of the method of FIG. 6, the determining may include the relay user device being pre-configured with the priority map.

According to an example implementation of the method of FIG. 6, the transmitting may include receiving, by the relay user device from the base station, a request for the priority map; and transmitting, by the relay user device in response to the request, the priority map to the base station.

According to an example implementation of the method of FIG. 6, the transmitting may include receiving, by the relay user device from the base station, a request for the relay user device to transmit the priority map to the base station if one or more trigger conditions are met; determining, by the relay user device, that the one or more trigger conditions have been met; and transmitting, by the relay user device in response to the request, the priority map to the base station.

According to an example implementation of the method of FIG. 6, the priority map may include: a priority map that indicates a mapping of a set of quality of service class identifier (QCI) values for one or more radio bearers provided between the base station and a relay user device and a second set of proximity services (ProSe) per packet priority (PPPP) values for one or more proximity services (ProSe) sidelink logical channels provided between the relay user device and a remote user device.

According to an example implementation, an apparatus may include at least one processor and at least one memory including computer instructions, when executed by the at least one processor, cause the apparatus to: determine, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and transmit, by the relay user device, the priority map to the base station.

A computer program product may include a non-transitory computer-readable storage medium and storing executable code that, when executed by at least one data processing apparatus, is configured to cause the at least one data processing apparatus to perform a method including: determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and transmitting, by the relay user device, the priority map to the base station.

According to another example implementation, an apparatus may include means (e.g., 702A/702B and/or 704, FIG. 7) for determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device; and means (e.g., 702A/702B and/or 704, FIG. 7) for transmitting, by the relay user device, the priority map to the base station.

Figure 7:
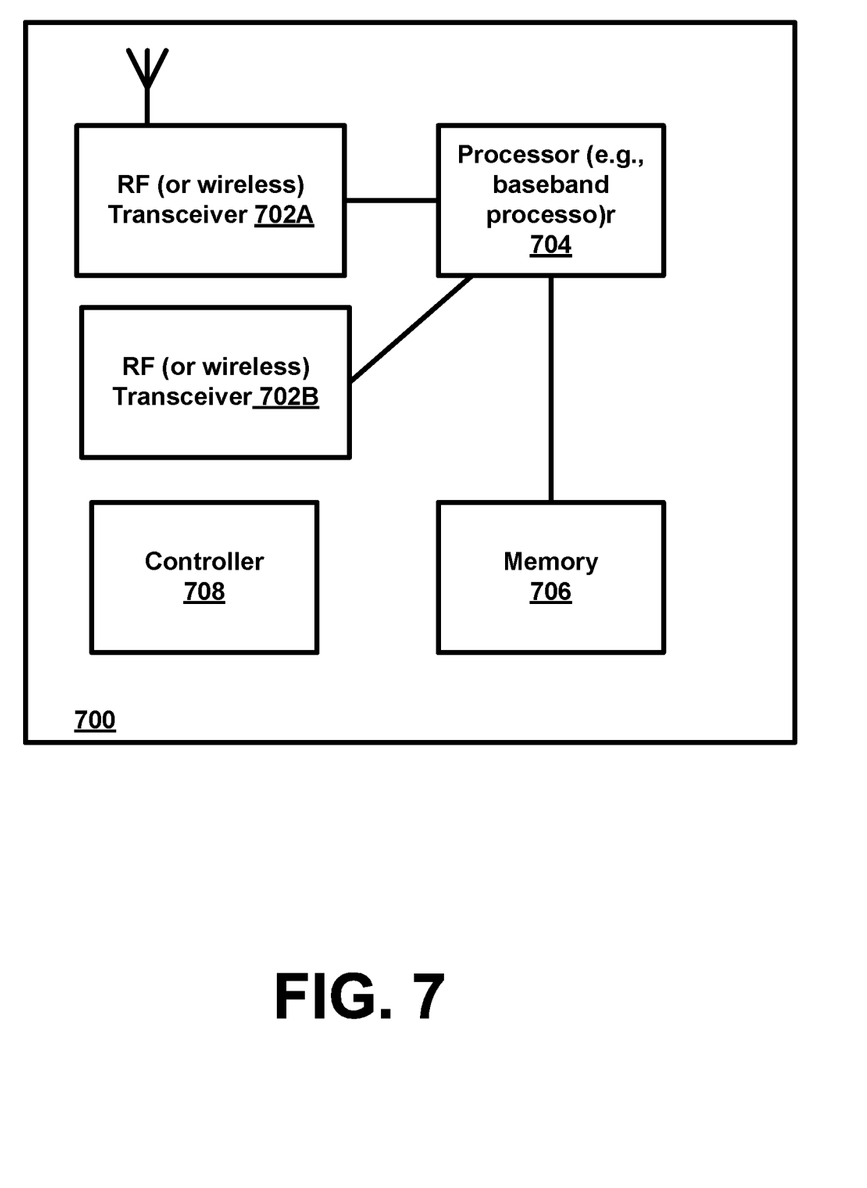
FIG. 7 is a block diagram of a network node (e.g., BS or user device) according to an example implementation.

FIG. 7 is a block diagram of a network node (e.g., BS or user device or D2D/ProSe wireless device) 700 according to an example implementation. The network node (or wireless station) 700 may include, for example, two RF (radio frequency) or wireless transceivers 702A, 702B, where each wireless transceiver includes a transmitter to transmit signals and a receiver to receive signals. The wireless station also includes a processor 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702. Processor 704 may control transmission of signals or messages over a wireless network, and may receive signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the network node 700, and may provide control for other systems not shown in FIG. 7, such as controlling input/output devices (e.g., display, keypad), and/or may execute software for one or more applications that may be provided on network node 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a base station in a wireless network, a priority map that indicates a mapping of a first set of priority classes for one or more radio bearers provided between the base station and a relay user device and a second set of priority classes for one or more proximity services (ProSe) sidelink logical channels provided between the relay user device and a remote user device, wherein the priority map indicates a mapping of a set of quality of service class identifier (QCI) values for one or more radio bearers provided between the base station and a the relay user device and a second set of proximity services (ProSe) per packet priority (PPPP) values for one or more proximity services (ProSe) sidelink logical channels provided between the relay user device and a the remote user device;
   determining a quality of service class identifier (QCI) value for a first radio bearer of the one or more radio bearers;
   receiving, by the base station, data for transmission to the relay user device via the first radio bearer of the one or more radio bearers provided between the base station and the relay user device;
   determining, based on the priority map, the ProSe per packet priority (PPPP) value that maps to the QCI value for the first radio bearer; and
   allocating, by the base station based on the determined PPPP value of the received data, wireless resources to the relay user device to transmit data to the remote user device for one or more of the ProSe sidelink logical channels.

2. The method of claim 1 wherein the receiving comprises:
   receiving, by the base station, the priority map from the relay user device.

3. The method of claim 1 wherein the receiving comprises:
   receiving, by the base station, the priority map from a core network.

4. The method of claim 1 wherein the receiving comprises:
   receiving, by the base station, the priority map within a handover request for the relay user device or as part of handover preparation for the relay user device.

5. The method of claim 1 wherein each of the sidelink logical channels is mapped to one of a plurality of logical channel groups depending on the ProSe per packet priority (PPPP) value of the sidelink logical channel.

6. The method of claim 1 wherein the priority map is specific to the relay user device.

7. The method of claim 1 and further comprising:
receiving, by the base station, an indication of queued data in a buffer status report, from the relay user device for a first logical channel group of the ProSe sidelink logical channels; and
allocating, by the base station in response to the buffer status report and based on the priority map, wireless resources to the relay user device to transmit data to the remote user device for the first logical channel group.

8. The method of claim 1 and further comprising:
receiving, by the base station, traffic to be forwarded to the remote user device via the relay user device;
prioritizing, by the base station based on the priority map, an allocation of wireless resources for the one or more radio bearers and the one or more proximity services (ProSe) sidelink logical channels;
allocating, by the base station based on the prioritizing, a first set of wireless resources to allow the received traffic to be transmitted from the base station to the relay station over a first radio bearer of the one or more radio bearers, and a second set of wireless resources to allow the received traffic to be transmitted from the relay user device to the remote user device via a first proximity services (ProSe) sidelink logical channel of the one or more proximity services (ProSe) sidelink logical channels.

9. The method of claim 1 and further comprising:
determining, by the base station, a need of reconfiguration for the relay user device based on the priority map in relation with quality of service class identifier (QCI) and sidelink logical channel group (LCG) priority mapping of the base station; and
reconfiguring the relay user device with a new sidelink logical channel group for one or more sidelink logical channels.

10. A method comprising:
determining, by a relay user device in a wireless network, a priority map that indicates a mapping of a first set of priority classes for one or more radio bearers provided between a base station and the relay user device and a second set of priority classes for one or more proximity services (ProSe) sidelink logical channels provided between the relay user device and a remote user device, wherein the priority map indicates a mapping of a set of quality of service class identifier (QCI) values for one or more radio bearers provided between the base station and the relay user device and a second set of proximity services (ProSe) per packet priority (PPPP) values for one or more proximity services (ProSe) sidelink logical channels provided between the relay user device and a remote user device;
transmitting, by the relay user device, the priority map to the base station;
receiving, by the relay user device from the base station based on the priority map, an allocation of wireless resources for a transmission of data to the remote user device, wherein the allocation of wireless resources is based on a mapping of a PPPP value, of the second set of PPPP values, that maps to a QCI value for a first radio bearer of the one or more radio bearers provided between the base station and the relay user device;
receiving the data by the relay user device via the first radio bearer; and
transmitting, by the relay user device via the allocated wireless resources, the data to the remote user device.

11. The method of claim 10 wherein the determining comprises:
receiving, by the relay user device, the priority map from a proximity services (ProSe) application or a core network.

12. The method of claim 10 wherein the determining comprises:
the relay user device being pre-configured with the priority map.

13. The method of claim 10 wherein the transmitting comprises:
receiving, by the relay user device from the base station, a request for the priority map; and
transmitting, by the relay user device in response to the request, the priority map to the base station.

14. The method of claim 10 wherein the transmitting comprises:
receiving, by the relay user device from the base station, a request for the relay user device to transmit the priority map to the base station if one or more trigger conditions are met;
determining, by the relay user device, that the one or more trigger conditions have been met; and
transmitting, by the relay user device in response to the request, the priority map to the base station.

15. An apparatus, comprising:
at least one processor; and
at least one non-transitory computer-readable storage medium comprising instructions, when executed by the at least one processor, are configured to cause the apparatus to perform the steps of claim 10.

* * * * *